March 3, 1959  J. HARRINGTON, JR  2,875,884
ARTICLE HANDLING MACHINES
Filed May 13, 1957
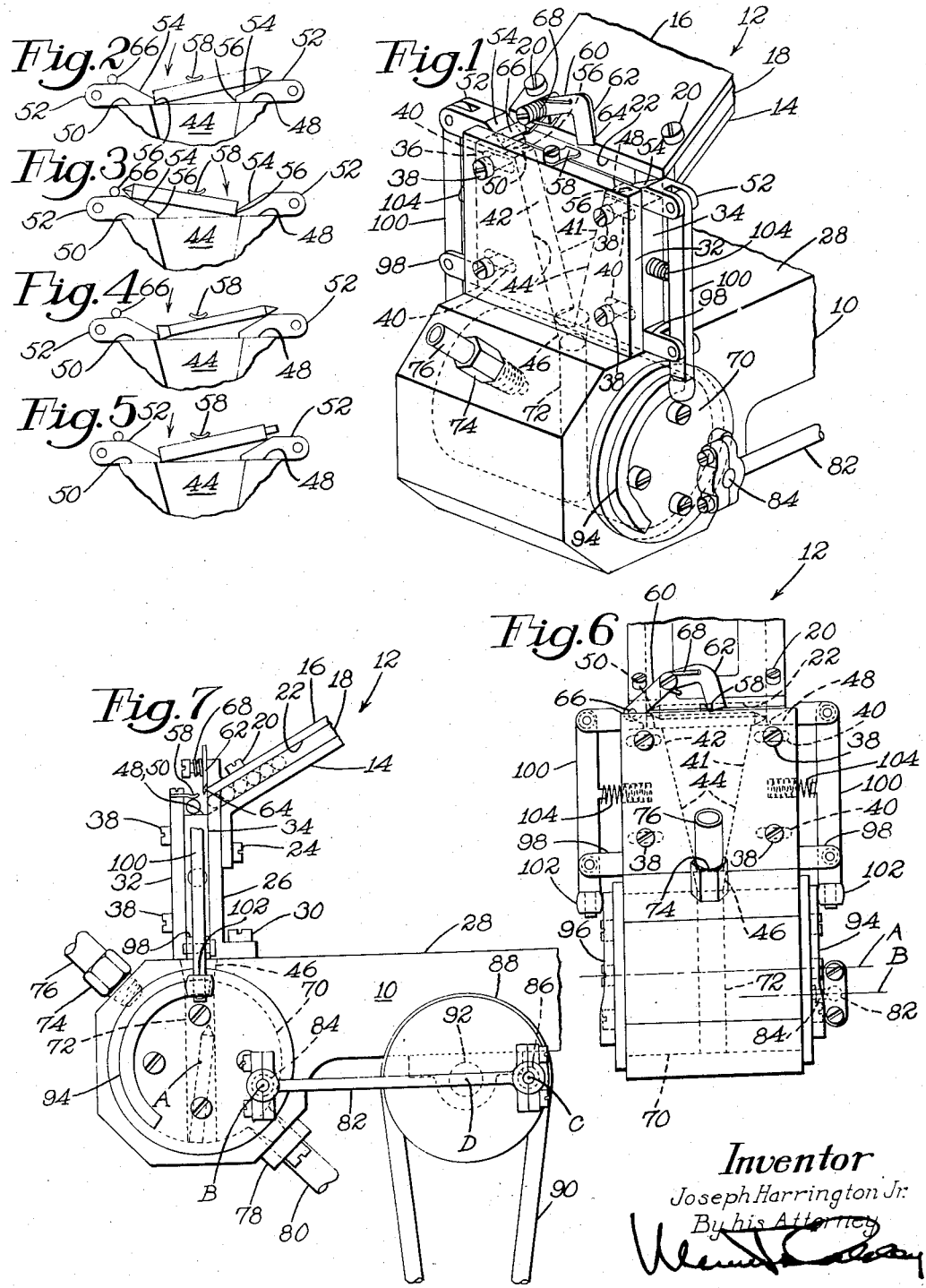
Inventor
Joseph Harrington Jr.
By his Attorney

United States Patent Office 2,875,884
Patented Mar. 3, 1959

2,875,884

ARTICLE HANDLING MACHINES

Joseph Harrington, Jr., Wenham, Mass., assignor to United Shoe Machinery Corporation, Flemington, N. J., a corporation of New Jersey Application May 13, 1957, Serial No. 658,758

6 Claims. (Cl. 198—33)

This invention relates to machines for orienting articles with respect to one another and more particularly for orienting with respect to their ends, elongated fasteners and the like having pointed or otherwise reduced portions at one end, the other end being headless or of substantially the same diameter as the shank portion.

In the operation of automatic tools for inserting common nails, tacks, screws and the like, the fasteners are frequently delivered to a raceway and suspended by their heads thereby effecting orientation and whereby no difficulty arises in conducting them to the tool point first. Obviously, the head suspension method of orienting cannot be used if so-called headless fasteners are to be inserted by the tool, so that other means must be employed to orient the fasteners with respect to their ends to enable them properly to be delivered to the inserting tool. While the invention is illustrated as embodied in a machine for orienting headless articles such as sash pins, brads, hinge pintles and similar articles having no heads, it will be understood that articles having relatively large head portions, such as common nails, may be oriented by the machine of the present invention if desired.

Accordingly, it is an object of this invention to provide a machine for orienting pointed articles with respect to their ends which are either headed or headless, the term "pointed" as used herein being understood to mean an article having an end smaller in cross section than the main body of the article.

Another object of this invention is to provide a machine for orienting pointed articles with respect to their ends which are either headed or headless and for conveying the oriented articles away from the orienting mechanism in uniform aligned relationship.

As a feature of this invention, there is provided a machine for orienting pointed articles comprising means for supporting articles one at a time in a position bridging an opening which is smaller than the length of the article. Means are provided for displacing the article lengthwise in the direction of its pointed end regardless of the direction in which it originally pointed whereupon the article will drop into the opening unpointed end first, thence to be constrained by a guideway to a conveying mechanism which receives the oriented article and transports it into a delivery conduit.

The above and other features of the invention including various novel details of construction and combinations of parts will now be more particularly described with reference to the accompanying drawings and pointed out in the claims.

In the drawings,

Fig. 1 is a perspective view of a fastener orienting and conveying machine embodying the invention;

Figs. 2 through 5 are similar detail views of a portion of the machine shown in Fig. 1 and illustrating a few of the various articles which may be handled by said machine; and Figs. 6 and 7 are front and side elevations, respectively, of the machine shown in Fig. 1.

The invention is herein illustrated embodied in a machine for orienting pointed fasteners, the machine having a frame member or base 10 of irregular configuration. Spaced above the base 10 is an inclined raceway 12 comprising a lower plate 14, an upper plate 16 and side plates 18 secured together by screws 20 to form a covered trough providing a passageway 22 which is rectangular in cross section and approximately the size of a fastener. The raceway 12 is secured by screws 24 to an upstanding plate 26 which in turn is secured to the upper surface 28 of the base 10 by screws 30.

Parallel with the upstanding plate 26 is a plate 32 and sandwiched between them are a pair of plates 34 and 36. The plates 26, 32, 34 and 36 are secured together as a unit by screws 38 which pass through slots 40 in the plates 34 and 36 to permit the adjustment of the plates 34 and 36 toward and away from each other relatively to the plates 26 and 32.

The plates 34 and 36 are constructed with sloping surfaces 41 and 42 arranged to form the side walls of a downwardly converging V-shaped guideway, generally indicated at 44 in Figs. 1 and 6. The front and back walls of the guideway are formed by the plates 26 and 32. The guideway is open at its upper and lower ends, the lower end leading to a bore 46 in the upper surface 28 of the frame 10. The upper surfaces 48 and 50 of the plates 34 and 36, respectively, lie below the upper surfaces of the plates 26 and 32 and form a two-part stationary fastener supporting member above the V-shaped guideway 44.

Slidable on the stationary surfaces 48 and 50 is a pair of identical fastener displacing members 52, best seen in Figs. 2 through 5. Each displacing member has a sloping surface 54 engageable with the pointed end of a fastener and a substantially vertical surface 56 engageable with the unpointed end of a fastener when a fastener is supported on the surfaces 48 and 50. It will be understood that pointed articles of many types, a few of which are seen in Figs. 2 through 5, may be oriented by this mechanism. The displacing members 52 are interchangeable and depending upon the size of the article or the configuration of its point the relative size of their surfaces 54 and 56 are accordingly governed.

A spring-like member 58 is secured to the plate 32 and extends toward the raceway 12 and over the upper opening of the V-shaped guideway 44 (see Fig. 7). Pivotally mounted on the plate 16 of the raceway 12 is a bell crank 60 having a depending arm 62 with a fastener camming surface 64 facing the raceway 12. A pin 66 projects from the opposite arm of the bell crank 60 and is engageable with the surface 54 of one of the fastener displacing members 52 and is held thereagainst by a coil spring 68.

Journaled in the frame member or base 10 is a cylinder 70 which is rotatable about an axis A (Figs. 6 and 7). A bore 72 passes through the cylinder 70 midway of its outer ends and is normal to the axis of rotation A. Threaded in the frame member 10 is an air inlet fitting 74 to which is attached a conduit 76 which may be connected to a source of compressed air. A second fitting 78 is threaded in the frame member 10 diametrically opposite the fitting 74. Attached to the fitting 78 is a conduit 80 which may be directed to any predetermined position such as a fastener collecting point or an inserting tool. A crank 82 is pivoted on a pin 84 secured to the cylinder 70 at a point B. The opposite end of the crank 82 is pivoted on a pin 86 secured to a pulley 88 at a point C. The pulley is continuously rotated about an axis D by a belt 90 or other suitable means. The axis D is the center of a shaft 92 journaled on the bottom of the frame member 10. The distance D, C is slightly less than the distance A, B and accordingly as the pulley 88 is continuously rotated, the cylinder 70 is oscillated about its axis A in an arc of slightly less than 180° from a position (as shown in Fig. 7) wherein the bore 72 in the cylinder 70 is aligned with the bore 46 in the frame member 10 to a position (not shown) wherein the bore 72 is aligned with the fittings 74 and 78.

Secured to the ends of the cylinder 70 is a pair of cams 94 and 96 having similarly formed cam faces. Pivoted in ears 98 extending outwardly from the plates 34 and 36 is a pair of rocker arms 100 on the lower ends of which are journaled cam rollers 102. The rollers are held in engagement with the faces of the cams 94 and 96 by compression springs 104 bearing outwardly against the rocker arms 100. The upper ends of the arms 100 are pivotally and removably secured to the fastener displacing members 52.

The machine is operated to orient and convey fasteners in the following manner. The plates 34 and 36 are adjusted laterally relatively to the plates 26 and 32 to form the V-shaped guideway 44 with its upper opening smaller than the length of the fasteners to be oriented whereby the stationary surfaces 48 and 50 provide a support for both ends of a fastener whereby the fastener bridges the upper opening of the guideway. Fasteners are fed by any suitable means to the upper end of the raceway 12 pointing indiscriminately in opposite directions. They roll down the raceway 12 with their axes in parallel relationship (see Fig. 7) until the endmost fastener rolls onto the stationary surfaces 48 and 50. The arm 62 of the bell crank 60 is held above the lower end of the raceway 12 by the spring 68 with the pin 66 engaging the surface 54 of one of the displacing members 52. The pulley 88 is then caused to rotate whereupon the crank 82 transmits oscillatory motion to the cylinder 70. As the cylinder 70 rotates in a clockwise direction (as shown in Fig. 7), the cams 94 and 96 cause the arms 100 to pivot in the ears 98, the upper ends of the arms moving the displacing members 52 inwardly simultaneously toward the fastener supported above the guideway 44. The inward movement of that displacing member 52 which engages the bell crank pin 66 causes the bell crank arm 62 to pivot downwardly preventing the next fastener in the raceway from rolling onto the supporting surfaces 48 and 50. As seen in Figs. 2 through 5, the vertical surface 56 of one of the members 52 engages the unpointed end of the fastener and moves it lengthwise in the direction of its pointed end causing the pointed end to be cammed upwardly on the sloping surface 54 of the other displacing member 52. The fastener is thus pivoted about the spring-like member 58 until its unpointed end is above the upper opening of the guideway 44 whereupon it drops through the opening pointed end uppermost into the guideway. Since all portions of the guideway 44 are narrower than the fastener, it will fall into the bore 46 pointed end uppermost coming to rest against the cylindrical surface of the cylinder 70.

As the pulley 88 completes one revolution, the cylinder 70 has undergone less than one-half a revolution and has returned to the position shown in Fig. 7, the bore 72 becoming re-aligned with the bore 46 whereupon the fastener then drops into the bore 72. The displacing members 52 are moved outwardly during the second half revolution of the pulley 88 whereupon the bell crank arm 62 moves upwardly permitting the next fastener in line to roll onto the supporting surfaces 48 and 50. During the next operating cycle, the fastener then in the bore 72 is rotated to a position whereby it is propelled through the fitting 78 and into the conduit 80 when the bore 72 becomes aligned therewith and is conveyed by the compressed air from the conduit 76 through the conduit 80 to its destination.

Having thus described my invention, what I claim as new and desire to secure by Letters Patent of the United States is:

1. In a machine for orienting, with respect to their ends, pointed articles such as fasteners and the like, stationary fastener supporting means, an opening formed in said supporting means, the widest portion of said opening being smaller than the length of a fastener to be oriented, means for positioning both ends of a fastener on said stationary supporting means bridging said opening, and means movable relatively to said stationary supporting means for displacing said fastener lengthwise with its pointed end moving away from the opening and its unpointed end moving into position above said opening whereby said fastener will fall into said opening pointed end uppermost.

2. In a machine for orienting, with respect to their ends, pointed articles such as fasteners and the like, stationary fastener supporting means, an opening formed in said stationary supporting means, the widest portion of said opening being smaller than the length of a fastener to be oriented, means for positioning both ends of a fastener on said stationary supporting means bridging said opening, means movable relatively to said stationary supporting means for displacing said fastener lengthwise with its pointed end moving away from the opening and its unpointed end moving into position above said opening whereby said fastener will fall into said opening pointed end uppermost, and a downwardly converging guideway communicating with said opening, the widest portion of said guideway being smaller than the length of the fastener being oriented whereby the fastener falling through said opening will be constrained by said guideway pointed end uppermost.

3. In a machine for orienting, with respect to their ends, pointed articles such as fasteners and the like, stationary fastener supporting means, an opening formed in said stationary supporting means, the widest portion of said opening being smaller than the length of a fastener to be oriented, means for positioning both ends of a fastener on said stationary supporting means bridging said opening, means movable relatively to said stationary supporting means for displacing said fastener lengthwise with its pointed end moving away from the opening and its unpointed end moving into position above said opening whereby said fastener will fall into said opening pointed end uppermost, a fastener conveying member having means to receive one fastener at a time from said opening, and means to move said conveying member from a fastener receiving position to a fastener delivering position in timed sequence with said displacing means.

4. In a machine for orienting, with respect to their ends, pointed articles such as fasteners and the like, stationary fastener supporting means, an opening formed in said stationary supporting means, the widest portion of said opening being smaller than the length of a fastener to be oriented, means for positioning both ends of a fastener on said stationary supporting means bridging said opening, means movable relatively to said stationary supporting means for displacing said fastener lengthwise with its pointed end moving away from the opening and its unpointed end moving into position above said opening whereby said fastener will fall into said opening pointed end uppermost, a downwardly converging guideway communicating with said opening, the widest portion of said guideway being smaller than the length of the fastener being oriented whereby the fastener falling through said opening will be constrained by said guideway pointed end uppermost, a fastener conveying member having means to receive one fastener at a time from said guideway, and means to move said conveying member from a fastener receiving position to a fastener delivering position in timed sequence with said displacing means.

5. In a machine for orienting, with respect to their ends, poined articles such a fasteners and the like, stationary fastener supporting means, an opening formed in said stationary supporting means, the widest portion of said opening being smaller than the length of a fastener to be oriented, means for positioning both ends of a fastener on said stationary supporting means bridging said opening, means movable relatively to said stationary supporting means for displacing said fastener lengthwise with its pointed end moving away from the opening and its unpointed end moving into position above said opening whereby said fastener will fall into said opening pointed end uppermost, a fastener conveying member comprising a rotatable cylinder below said opening and having a transverse fastener receiving aperture formed therein, means to oscillate said cylinder whereby said aperture is moved from a fastener receiving to a fastener delivering position, and means to transmit motion from said cylinder to said displacing means whereby said conveying member and said displacing means operate in synchronism.

6. In a machine for orienting, with respect to their ends, pointed articles such as fasteners and the like, a downwardly converging V-shaped guideway having upper and lower openings, said upper opening being larger than said lower opening and smaller than the length of a fastener to be oriented, means for positioning a fastener above said guideway bridging said larger opening, and means for displacing the fastener lengthwise in the direction of its pointed end whereby said fastener will fall into said guideway pointed end uppermost and will be constrained in its downward movement by said guideway, said displacing means comprising a pair of fastener engaging members movable in opposite directions simultaneously toward said larger opening of the guideway, said engaging members being identical and each having a surface engageable with the unpointed end of the fastener arranged to move said unpointed end to a position above said larger opening and a second surface engageable with the pointed end of a fastener arranged to elevate said pointed end away from said larger opening.

References Cited in the file of this patent

UNITED STATES PATENTS

| | | |
|---|---|---|
| 1,020,743 | Burlingtham et al. | Mar. 19, 1912 |
| 1,658,428 | Charles | Feb. 7, 1928 |
| 2,105,084 | Kivley et al. | Jan. 11, 1938 |
| 2,534,140 | Moore | Dec. 12, 1950 |